US008606952B2

(12) United States Patent
Pasetto et al.

(10) Patent No.: US 8,606,952 B2
(45) Date of Patent: *Dec. 10, 2013

(54) METHOD AND SYSTEM FOR OPTIMIZING BANDWIDTH USAGE IN REMOTE VISUALIZATION

(75) Inventors: Davide Pasetto, Dublin (IE); Ronán Bohan, Dublin (IE); Mark Levins, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 614 days.

This patent is subject to a terminal disclaimer.

(21) Appl. No.: 12/351,971

(22) Filed: Jan. 12, 2009

(65) Prior Publication Data

US 2009/0183085 A1      Jul. 16, 2009

(30) Foreign Application Priority Data

Jan. 15, 2008   (EP) .................................... 08150253

(51) Int. Cl.
*G06F 15/16*      (2006.01)

(52) U.S. Cl.
USPC ........................................................ 709/231

(58) Field of Classification Search
USPC ................. 709/201, 203, 204, 207, 238, 240; 725/62, 63, 74, 105, 114, 115, 116, 725/117, 118, 119, 135, 136, 143, 144, 145, 725/146, 147, 148, 151
See application file for complete search history.

(56) References Cited

U.S. PATENT DOCUMENTS

| 5,798,796 A | 8/1998 | Sugiyama |
| 6,281,874 B1 | 8/2001 | Sivan et al. |
| 7,116,833 B2 | 10/2006 | Brower et al. |
| 7,430,681 B1 * | 9/2008 | Hobbs ........................... 713/400 |
| 7,895,521 B2 * | 2/2011 | Bhogal et al. .................. 715/740 |
| 2001/0043615 A1 * | 11/2001 | Park et al. ...................... 370/474 |
| 2003/0041106 A1 * | 2/2003 | Tuli ............................... 709/203 |
| 2004/0064577 A1 * | 4/2004 | Dahlin et al. ................. 709/235 |
| 2005/0216859 A1 * | 9/2005 | Paek et al. ..................... 715/810 |
| 2006/0176951 A1 | 8/2006 | Berman et al. |

* cited by examiner

*Primary Examiner* — Scott Christensen
(74) *Attorney, Agent, or Firm* — The Steadman Law Firm PLLC; Cynthia G. Seal; Katherine S. Brown

(57) ABSTRACT

A method and system for optimizing bandwidth usage in remote visualization are provided. The method may comprise determining a region of interest and a region of non-interest of the image; sending data relating to the region of interest via a reliable priority data stream; and sending data relating to the region of non-interest via a less reliable non-priority data stream. The priority data stream may be a high quality and/or high speed data stream, while the non-priority data stream may be a lower quality and/or lower speed data stream. The region of interest and the region of non-interest may be determined in various ways, including via automatic selection (e.g., through the use of image-based algorithms), via an application programming interface of one of a plurality of graphics applications that generate the image, or via manual selection by a user.

21 Claims, 8 Drawing Sheets

METHOD AND SYSTEM FOR OPTIMIZING BANDWIDTH USAGE IN REMOTE VISUALIZATION

RELATED APPLICATION

This application claims priority under 35 U.S.C. §119 to European Patent Application No. 08150253.6 filed Jan. 15, 2008, the entire text of which is specifically incorporated by reference herein.

FIELD OF THE INVENTION

The various embodiments described herein relate to the field of remote visualization. In particular, the various embodiments relate to optimizing bandwidth usage in remote visualization.

BACKGROUND OF THE INVENTION

Remote visualization solutions allow end-users of a graphical desktop to interact with graphical applications from a remote machine (e.g., a thin client).

Thin client viewers receive images over the network, which are rendered to give end-users the impression that they are using an application locally on their computer or workstation.

There are a number of remote visualization applications available at present. Some of them, such as the exported display feature of X11, Citrix Presentation Server (Citrix is a trade mark of Citrix Systems, Inc.), or Terminal Services (i.e., Remote Desktop Services) from Microsoft Corporation, use a specialized protocol to transmit messages to connected viewers or to display information in the case of X11. Alternatives, including Virtual Network Computing (VNC), comprise a server that monitors for any modifications and transmits a compressed image reflecting such modifications from the server back to one or more clients (i.e., end-stations).

One major limitation of all of these known approaches is bandwidth saturation. This is especially true in the case of VNC, for which the number of connected end-stations (e.g., client 'viewers') to a single computing device may be large. As a server identifies changes to such computing device, it must distribute these changes to each of the connected end-stations. Although specialized algorithms have been developed to decimate and compress updated information that must be sent to end-stations, the server still must transmit the resultant data block to each end-station in order to keep the display of each end-station in sync with the server.

As the number of end-stations or the number of required data updates increases, network bandwidth resources become saturated with such updates, resulting in a lower throughput for each connected end-station.

SUMMARY OF THE INVENTION

It is an aim of the various embodiments described herein to utilize limited bandwidth in an efficient way. Specifically, the bandwidth may be used to send regions "of interest" of the display in high quality via a reliable transport protocol, while regions "of non-interest" (i.e., the regions that are not determined to be "of interest") may be sent in lower quality via a less reliable transport protocol, capitalizing on any data dropping capabilities inherent in such transmission protocol if available bandwidth is exceeded.

According to a first aspect of the various embodiments, a method is provided for transmitting an image for remote display. The method may be used for optimizing bandwidth in remote visualization. The method may comprise determining a region of interest and a region of non-interest of the image; sending data relating to the region of interest via a reliable priority data stream; and sending data relating to the region of non-interest via a less reliable non-priority data stream. The priority data stream may be a high quality and/or high speed data stream, while the non-priority data stream may be a lower quality and/or lower speed data stream.

According to a second aspect of the various embodiments, a system is provided for transmitting an image for remote display. The system may be used for optimizing bandwidth in remote visualization. The system may comprise a server configured for generating the image; a client configured for displaying the image; a selector configured for determining a region of interest and a region of non-interest of the image; a reliable priority transmission apparatus operatively coupling the server to the client, wherein the priority transmission apparatus is configured for sending data relating to the region of interest; and a less reliable non-priority transmission apparatus operatively coupling the server to the client, wherein the non-priority transmission apparatus is configured for sending data relating to the region of non-interest.

According to a third aspect of the various embodiments, a computer program product is provided that may be loadable into the internal memory of a digital processing system (e.g., a computer), wherein the computer program product may comprise software code portions for carrying out the aforementioned method when the computer program product is run on the digital processing system.

According to a fourth aspect of the various embodiments, a method for providing a service to a customer over a network is provided. The method may comprise determining a region of interest in the image; sending the data relating to the region of interest via a reliable priority data stream; and sending the data relating to other regions (i.e., regions of non-interest) via a less reliable non-priority data stream. The priority data stream may be a high quality and/or high speed data stream, while the non-priority data stream may be a lower quality and/or lower speed data stream.

The various embodiments may permit determination of regions of interest and/or regions of non-interest of an image in various ways, including via automatic selection (e.g., through the use of image-based algorithms), via an application programming interface of one of a plurality of graphics applications that generate the image, or via manual selection by a user.

Furthermore, the various embodiments may send regions of interest via a reliable transmission protocol, and such protocol may transmit the regions of interest at a high image quality and/or at a high update frequency (i.e., refresh rate). Conversely, the various embodiments may send regions of non-interest via a less reliable transmission protocol, and such protocol may transmit the regions of non-interest at a lower image quality and/or at a lower update frequency.

BRIEF DESCRIPTION OF THE DRAWINGS

Various exemplary embodiments will now be described with reference to the accompanying drawings, in which.

DETAILED DESCRIPTION

Figure 1:
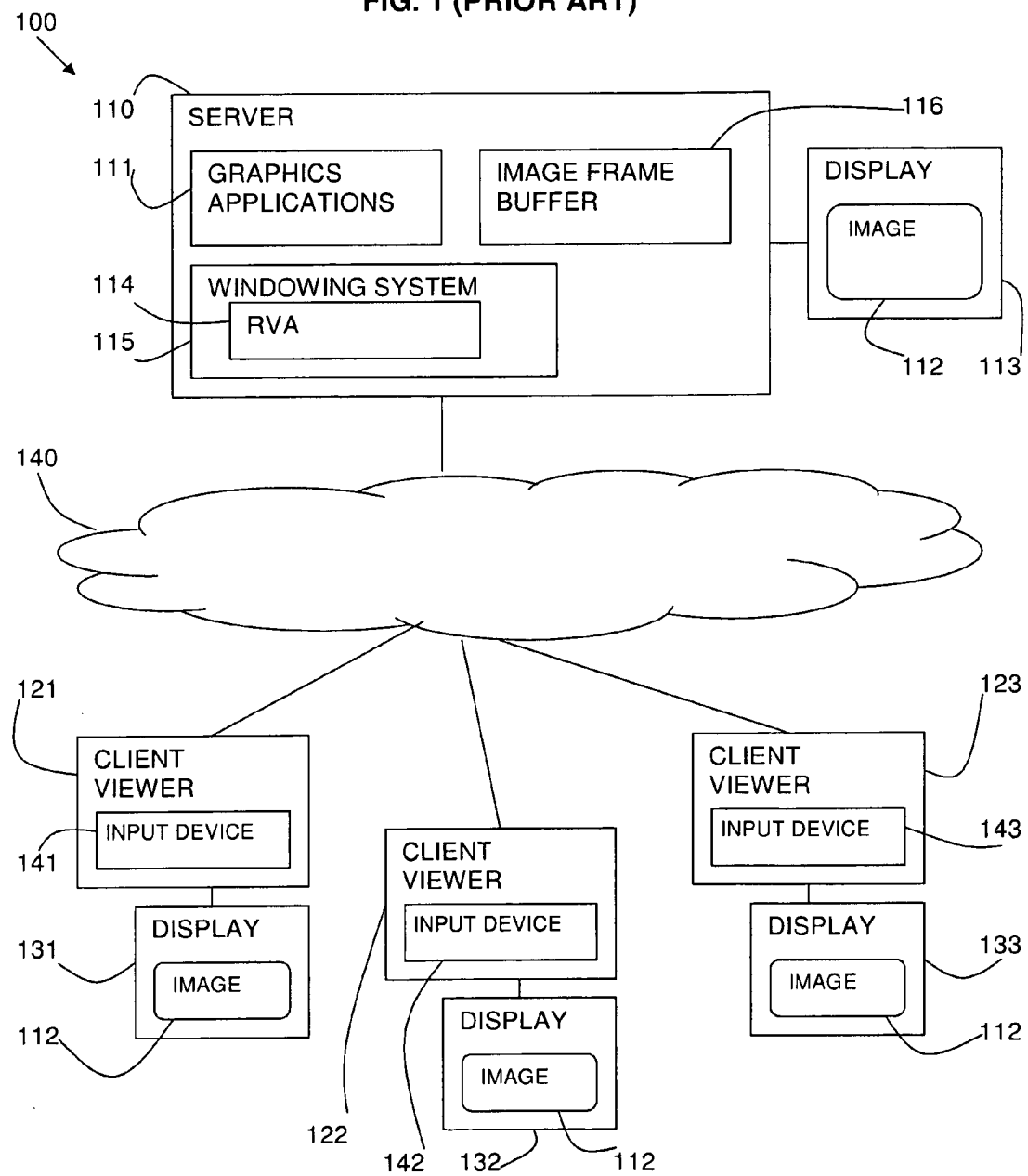
FIG. 1 is a block diagram of a remote visualization system as known in the prior art.

Referring to FIG. 1, a remote visualization system 100 is provided as known in the prior art. A server system 110 is provided on which a plurality of graphics applications 111 are executed. The plurality of graphics applications 111 generate an image 112 on a server display 113.

A plurality of remote client systems (i.e., client viewers) 121, 122, and 123 are connected to the server system 110 via a network 140. The remote client systems 121, 122, and 123 respectively comprise local client displays 131, 132, and 133 and input devices 141, 142, and 143. The remote client systems 121, 122, and 123 can view the server image 112 on the respective local client displays 131, 132, and 133. A remote client system 121, 122, 123 can interact with the plurality of server graphics applications 111 on the client display 131, 132, 133 via the input device 141, 142, 143.

A remote visualization adapter (RVA) software module 114 is installed on a windowing system 115 of the server system 110. An image frame buffer 116 is constantly updated by the windowing system 115 and by the plurality of graphics applications 111.

Figure 2:
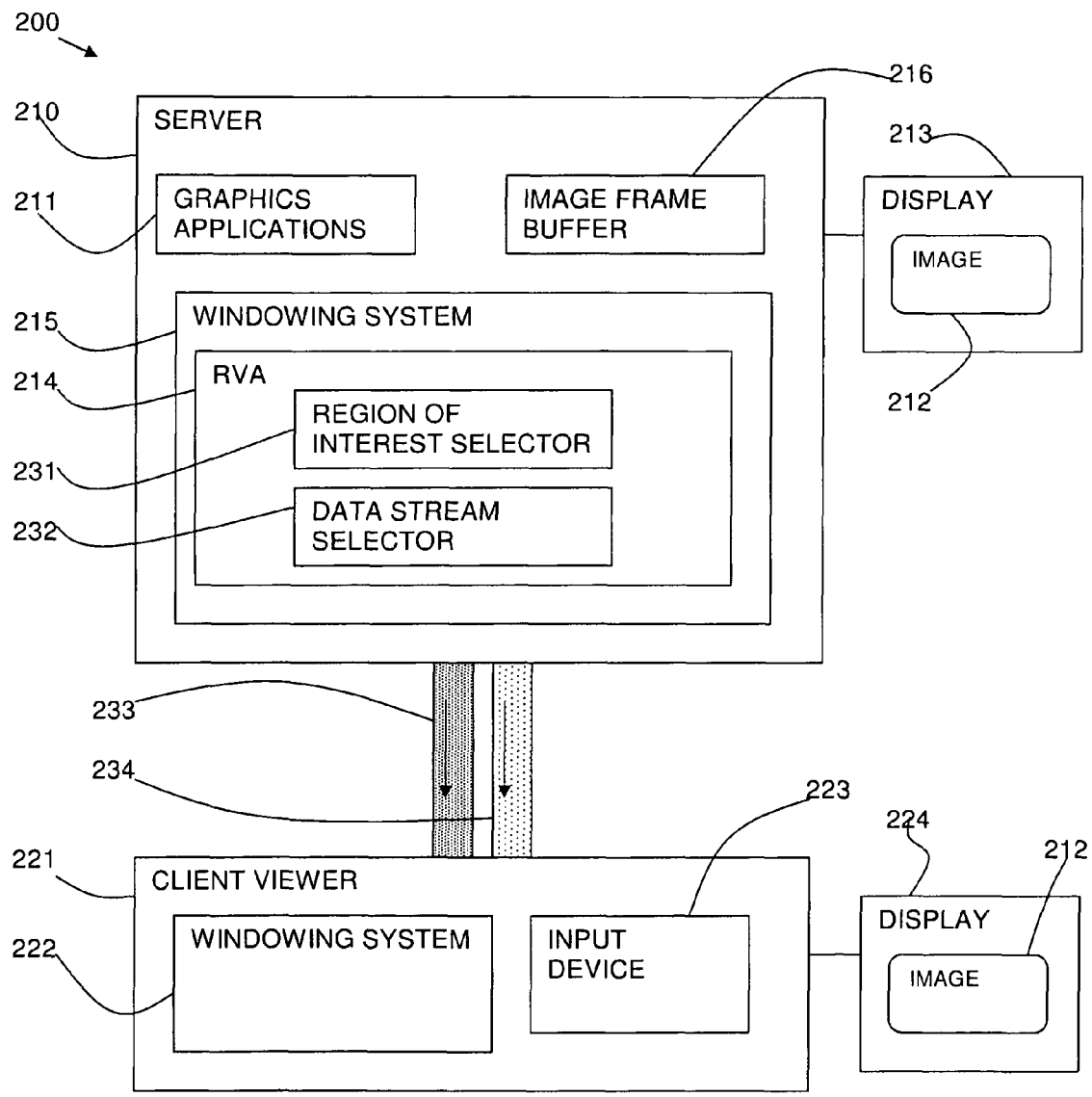
FIG. 2 is a block diagram of a remote visualization system in accordance with an exemplary embodiment.

Referring to FIG. 2, a remote visualization system 200 according to an exemplary embodiment is provided that optimizes bandwidth usage. As with the remote visualization system 100 of FIG. 1, the remote visualization system 200 may comprise a server system 210 on which a plurality of graphics applications 211 may be executed. The plurality of graphics applications 211 may generate an image 212, and the image 212 may be displayed on a server display 213. A remote visualization adapter (RVA) software module 214 may be installed on a windowing system 215 of the server system 210. An image frame buffer 216 may be constantly updated by the windowing system 215 and by the plurality of graphics applications 211.

A remote client system (i.e., client viewer system) 221 may be connected to the server system 210 via a network. The client viewer system 221 may comprise an input device 223 and may run a windowing system 222. The remote client system 221 may be a viewer that may view the server image 212 on a local client display 224. The client viewer system 221 may interact with the plurality of server graphics applications 211 on the client display 224 via the input device 223.

The server system 210 may be run on any information processing system (e.g., a desktop computer, server, etc.) capable of providing the functionality necessary for its implementation. Similarly, the client viewer system 221 may be run on any information processing system (e.g., a workstation computer, thin client, etc.) capable of providing the functionality necessary for its implementation. An exemplary data processing system for implementing the server system 210 and/or the client viewer system 221 is described herein with reference to FIG. 5. It is important to note that a given information processing device may be used for the server system 210 at one time and may be used for the client viewer system 221 at another time—i.e., a given information processing device may function as both the server system 210 and the client viewer system 221.

The RVA 214 of the server system 210 illustrated in FIG. 2 may comprise a region of interest selector 231 and a data stream selector 232. The remote visualization system 200 may send image data from the server system 210 to the client viewer system 221 via a first (priority) data stream 233 and a second (non-priority) data stream 234.

The first (priority) data stream 233 may be a reliable, high quality, and/or high speed data stream that may be sent from the server system 210 to the client viewer system 221 via a priority transmission apparatus. Such priority transmission apparatus may operatively couple the server system 210 to the client viewer system 221 and may comprise a wired channel, a wireless channel, or a combination of both. The first (priority) data stream 233 may be an uncompressed/raw image stream or a compressed image stream using lossless or almost lossless techniques sent via Transmission Control Protocol (TCP). The second (non-priority) data stream 234 may be a less reliable, lower quality, and/or lower speed data stream that may be sent from the server system 210 to the client viewer system 221 via a non-priority transmission apparatus. Such non-priority transmission apparatus may operatively couple the server system 210 to the client viewer system 221 and may comprise a wired channel, a wireless channel, or a combination of both. The second (non-priority) data stream 234 may be a highly compressed image stream using, e.g., lossy techniques sent via User Datagram Protocol (UDP).

The region of interest selector 231 may identify regions "of interest" in the server image 212, and the data stream selector 232 may send such regions of interest from the server system 210 to the client viewer system 221 via the first (priority) data stream 233. Other regions of the image 212 may be sent as regions "of non-interest" from the server system 210 to the client viewer system 221 via the second (non-priority) data stream 234.

Superior update frequency and/or update quality may be provided for the first (priority) data stream 233 as compared to the second (non-priority) data stream 234.

Figure 3:
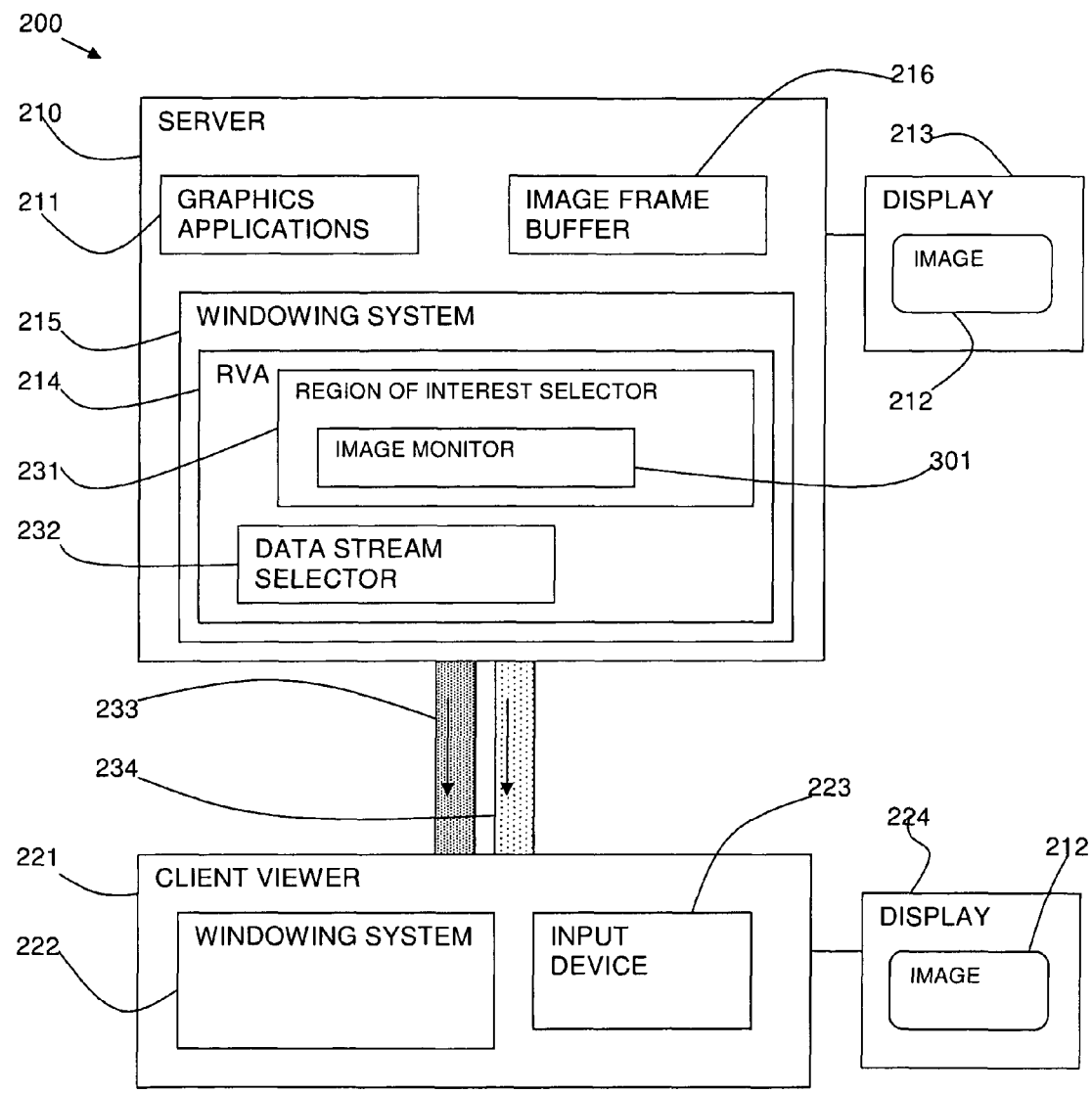
FIG. 3 is a block diagram of a remote visualization system in accordance with another exemplary embodiment.
Figure 4:
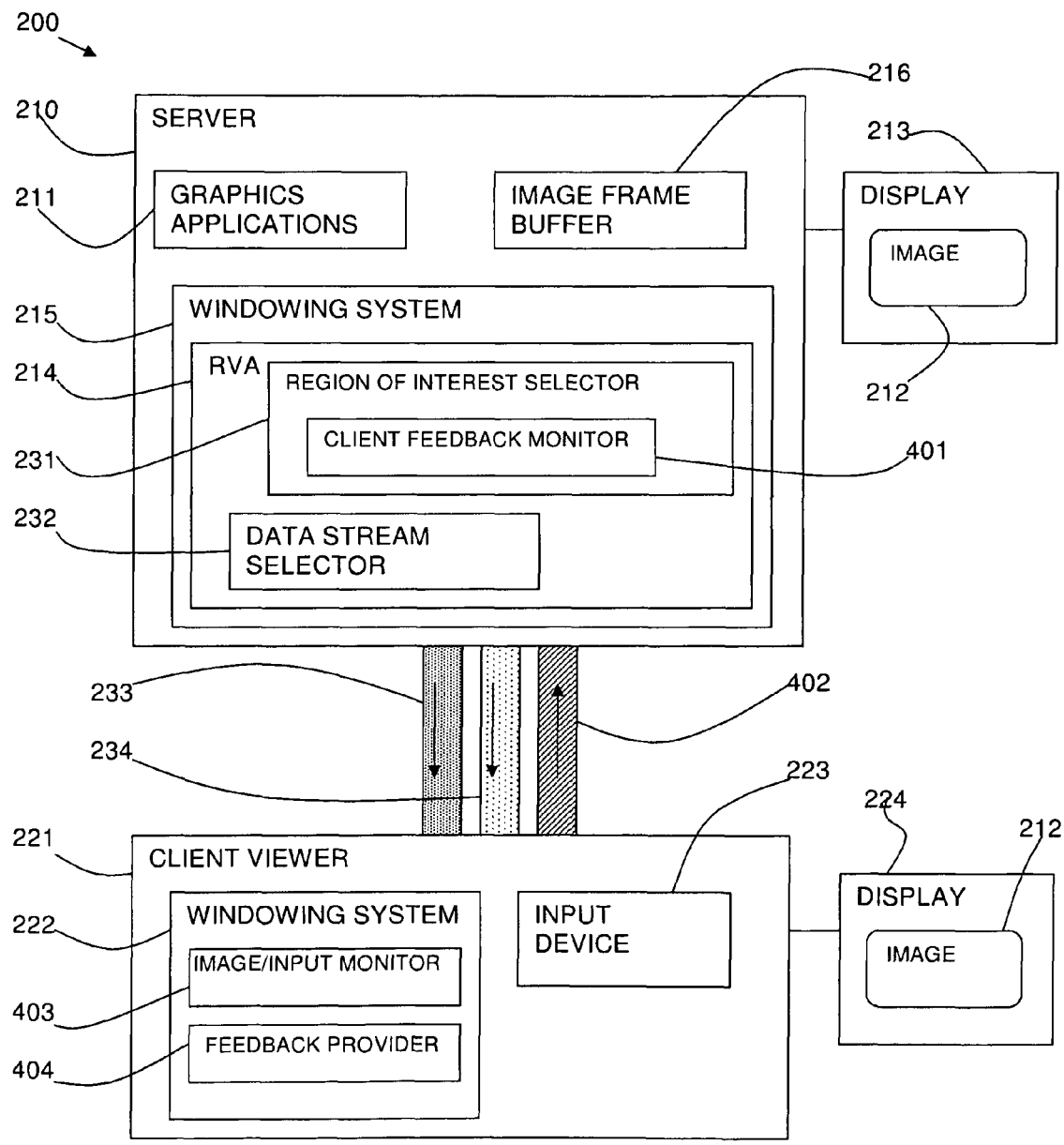
FIG. 4 is a block diagram of a remote visualization system in accordance with another exemplary embodiment.

Selection of regions of interest may be carried out by different methods or by a combination of methods. According to an exemplary embodiment described with reference to FIG. 3, regions of interest may be determined at the server system 210. According to another exemplary embodiment described with reference to FIG. 4, regions of interest may be determined at the client viewer system 221. FIGS. 3 and 4 both illustrate the remote visualization system 200 of FIG. 2 with further components implementing the functionality of determining regions of interest either at the server system 210 (FIG. 3) or at the client viewer system 221 (FIG. 4). Components common to both embodiments have the same reference numbers.

Referring to FIG. 3, an exemplary embodiment of the remote visualization system 200 is provided in which regions of interest are determined at the server system 210. As is the case with the embodiment of FIG. 2, the RVA 214 of the server system 210 may comprise a region of interest selector 231 and a data stream selector 232. The region of interest selector 231 according to this embodiment may comprise an image monitor 301 that may monitor the image 212 at the server system 210 and may identify changed regions of the image 212. Changed regions generally may be rectangular regions of the image 212 in which content is modified.

The image monitor 301 of the region of interest selector 231 may examine each changed region and may split it, examining it for regions of interest. Regions of interest may be selected at the transmitting (server) end in various ways. Image-based algorithms may be used to automatically select regions of interest based on certain parameters or conditions. Such algorithms may select regions of interest based on change in the image 212 from a previous frame; rate of change in the image 212 or portions thereof; one or more user-defined parameters; and/or seed points (which may be used in accordance with, e.g., a Moving Pictures Experts Group (MPEG) standard).

Moreover, regions of interest may be selected via an application programming interface (API) of one of the plurality of graphics applications 211 that generate the image 212. Specifically, such API may be used by one of the plurality of graphics applications 211 to select regions of interest in the image 212. For example, such API may be used to mark regions of interest for a user based on a user's application interaction, preferences, etc.

Furthermore, regions of interest may be selected manually and dynamically by a user at the transmitting (server) end of the connection, e.g., by a user choosing a specific window or part of a window or by always selecting the active window. Such region of interest determination by a user may be via a pointer mechanism, such as a mouse, on the display. For example, the server system 210 may select the area around a user's mouse pointer as a region of interest, or the server system 210 may select the area of the screen where the pointer is most often positioned as a region of interest. Alternatively, the user may manually select a region of interest by dragging the mouse.

The RVA 214 may use the data stream selector 232 to update the client viewer system 221 with the regions of interest via the first (priority) data stream 233 (having higher speed, quality, and/or reliability).

The RVA 214 may use the data stream selector 232 to update the client viewer system 221 with the regions of non-interest (which may be the regions of the image 212 that are not determined to be regions of interest) via the second (non-priority) data stream 234 (having lower speed, quality, and/or reliability).

Referring to FIG. 4, another exemplary embodiment of the remote visualization system 200 is provided in which regions of interest are determined at the client viewer system 221. According to this embodiment, the RVA 214 of the server system 210 may comprise a region of interest selector 231 based on a client feedback monitor 401. The remote visualization system 200 according to this embodiment may comprise a third data stream in the form of a reliable low bandwidth feedback stream 402. The feedback stream 402 may be sent from the client viewer system 221 to the server system 210 via a feedback transmission apparatus. Such feedback transmission apparatus may operatively couple the client viewer system 221 to the server system 210 and may comprise a wired channel, a wireless channel, or a combination of both.

According to the exemplary embodiment described with respect to FIG. 4, the windowing system 222 of the client viewer system 221 may comprise an image/input monitor 403 and a feedback provider 404 for providing appropriate client activity feedback to the server system 210 via the feedback stream 402. Such feedback may include information regarding determined regions of interest and/or regions of non-interest. For instance, the image/input monitor 403 may determine (e.g., periodically) whether a user is hovering over (e.g., with an input device such as a mouse) or otherwise interacting with a section of the image 212, and based on the user activity the feedback provider 404 may send feedback indicating regions of interest and/or regions of non-interest to the server system 210 via the feedback stream 402. Subsequently, the client feedback monitor 401 of the server system 210 may examine the information provided by the feedback stream 402 so that the client feedback indicating regions of interest and/or regions of non-interest may be processed by the server system 210. Consequently, appropriate image updates may be sent to the client viewer system 221.

The regions of interest at the receiving (client) end may be determined in various ways. It may be based on image-based algorithms at the client viewer system 221 that may be used to automatically select regions of interest based on certain parameters or conditions (previously described herein). Moreover, regions of interest may be selected manually and dynamically by a user at the receiving (client) end of the connection. For example, it may be based on a radius extending from a client mouse pointer positioned on the image 212. The embodiment may also comprise a way to gradually improve image updates delivered to the client viewer system 221 based on a static mouse pointer—i.e., once the client mouse pointer stops moving and becomes statically positioned on the image 212, the region of interest around the pointer may expand (e.g., radially) to provide further high quality updates.

When multiple clients are connected to a single desktop system (i.e., there are multiple client viewer systems 221) and regions of interest are determined at the receiving (client) end, the clients may have distinct regions of interest depending on the different conditions on each of the client viewer systems 221 and their relation to the region of interest criteria. Accordingly, each client viewer system 221 may use the priority data stream 233 and the non-priority data stream 234 for separate and distinct image updates. The client feedback monitor 401 may record the region of interest data for each client viewer system 221 and may use the saved information to select for each client viewer system 221 the appropriate updates to send and the appropriate data stream (priority data stream 233 or non-priority data steam 234) to use for such updates.

The exemplary embodiments described herein with reference to FIGS. 3 and 4 may be used independently or in combination with each other. Moreover, other available algorithms may be used for selecting regions of interest in accordance with the described exemplary embodiments.

Figure 5:
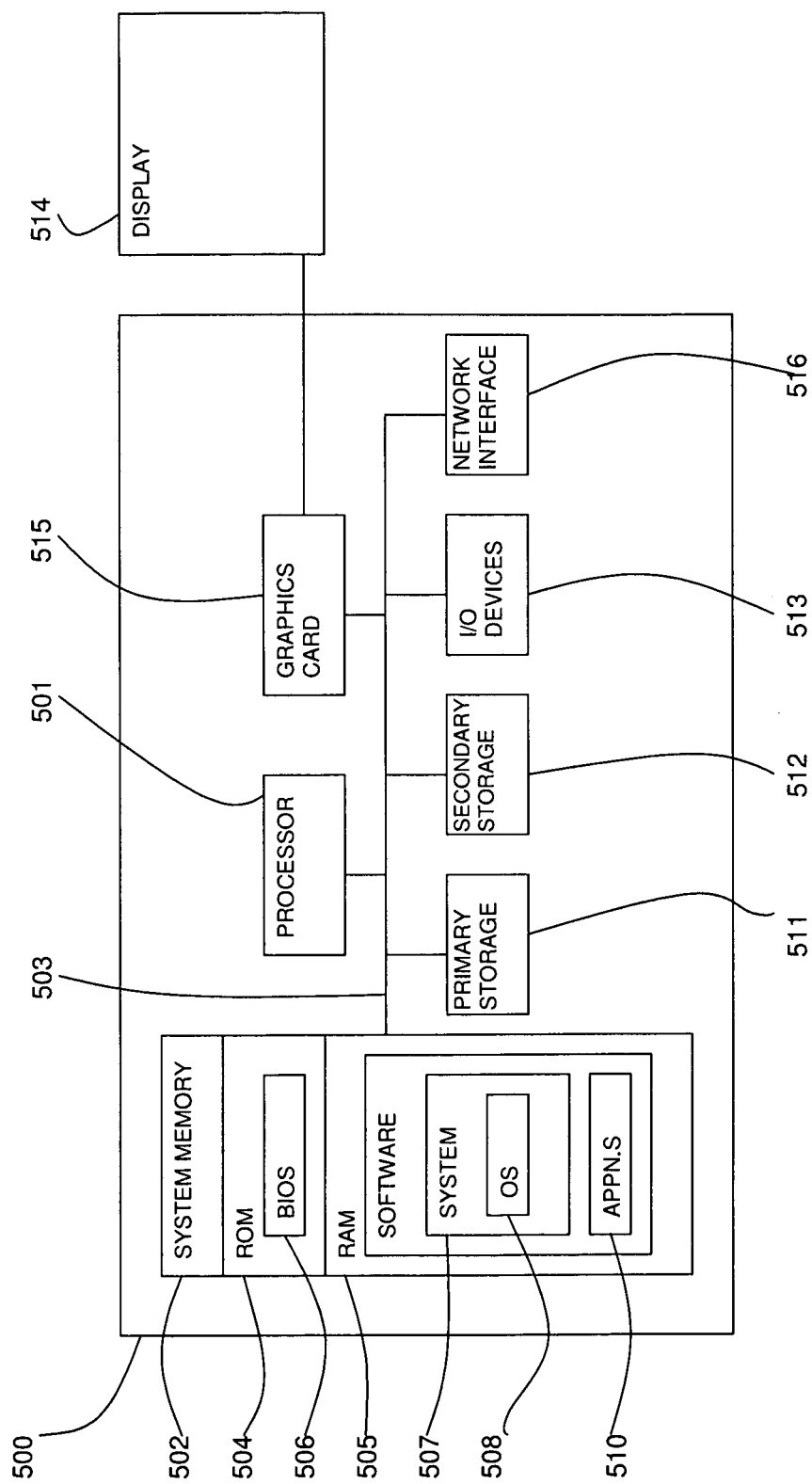
FIG. 5 is a block diagram of a data processing system in which various embodiments may be implemented.

Referring to FIG. 5, an exemplary system for implementing the server system 210 and/or the client viewer system 221 referred to herein with reference to FIGS. 2 through 4 is described. The server system 210 and/or the client viewer system 221 may assume the form of a data processing system 500 suitable for storing and/or executing program code. The data processing system 500 may comprise at least one central processing unit 501 that may be coupled directly or indirectly to memory elements via a system bus 503. The memory elements may comprise local memory employed during actual execution of the program code, bulk storage, and cache memories. The cache memories may provide temporary storage of at least some program code in order to reduce the number of times code must be retrieved from the bulk storage during execution.

The memory elements may comprise system memory 502 in the form of read only memory (ROM) 504 and/or random access memory (RAM) 505. A basic input/output system (BIOS) 506 may be stored in ROM 504. System software 507 may be stored in the RAM 505, including operating system (OS) software 508. Software applications 510 also may be stored in the RAM 505.

The data processing system 500 also may comprise a primary storage apparatus 511, such as a magnetic hard disk drive, and a secondary storage apparatus 512, such as a magnetic disk drive or an optical disk drive. The drives and their associated computer-readable media may provide non-volatile storage of computer-executable instructions, data structures, program modules, and other data for the data processing system 500. Software applications may be stored on the primary storage apparatus 511, the secondary storage apparatus 512, and/or the system memory 502.

The data processing system 500 may operate in a networked environment using logical connections to one or more remote computers via a network interface (i.e., network adapter) 516.

Input/output (I/O) devices 513 may be coupled to the data processing system 500 either directly or through I/O controllers. A user may enter commands and information into the data processing system 500 through input devices such as a keyboard, pointing device, or other input devices (for example, microphone, joystick, game pad, satellite dish, scanner, or the like). Output devices may include speakers, printers, etc. A display device 514 also may be connected to the system bus 503 via a graphics card 515.

The description herein relates to remote visualization solutions. However, the selection of a region of interest and corresponding selection of reliable and less reliable data streams also may be applied in other fields in which images are transmitted remotely. For example, principles of the various embodiments described herein may be applied in the field of digital point-to-point (P2P) or point-to-multipoint (P2MP) video, such as video on demand and video conferencing systems. In such video applications, automatic selection of a region of interest at the transmitting end may be used, e.g., using motion detection techniques already employed in MPEG compression. The video stream portions "of interest" (i.e., priority portions) may be sent using a reliable transmission protocol (e.g., TCP), while the video stream portions "of non-interest" in the background of the overall images (i.e., non-priority portions) may be sent using a transmission protocol of lower reliability (e.g., UDP).

The processes for using regions of interest for optimizing bandwidth usage in remote visualization solutions or in other fields such as P2P video are described below with reference to the various flow diagrams.

Figure 6:
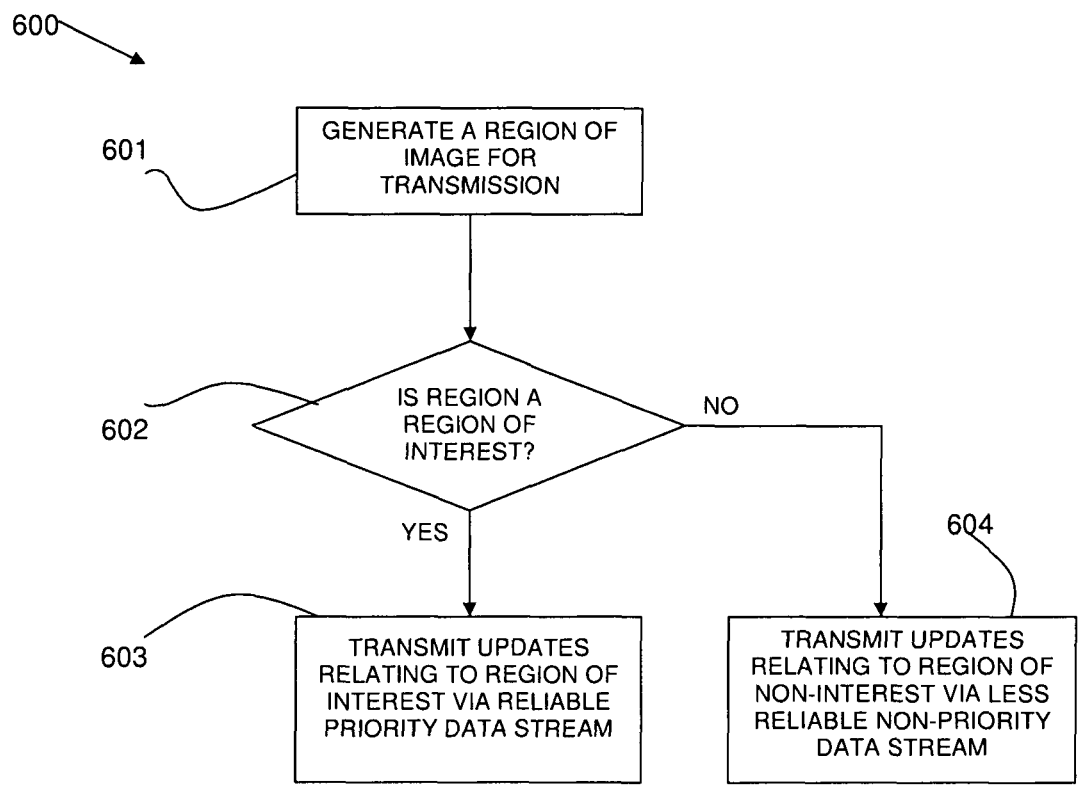
FIG. 6 is a flow diagram of a process at a server for transmitting regions "of interest" and/or regions "of non-interest" of an image in accordance with an exemplary embodiment.

Referring to FIG. 6, a flow diagram of a process 600 at a server is provided according to an exemplary embodiment. The process 600 may be used for transmitting regions of interest and/or regions of non-interest of an image. In step 601, a server may generate a region of an image for transmission to a client. In step 602, it may be determined whether the region of the image is a region of interest. As described herein, regions of interest may be determined by an automatic selection process at the server or at the client with an appropriate feedback mechanism to the server. Alternatively, regions of interest may be manually determined via a user through the use of an input mechanism. Such manual determination may be at the server or may be at the client with an appropriate feedback mechanism to the server.

If in step 602 it is determined that the region of the image is a region of interest, then in step 603 data updates relating to the region of interest may be transmitted to the client via a reliable (priority) data stream. Conversely, if it is determined that the region of the image is not a region of interest (i.e., the region is a region of non-interest), then in step 604 data updates may be transmitted to the client via a less reliable (non-priority) data stream.

Figure 7:
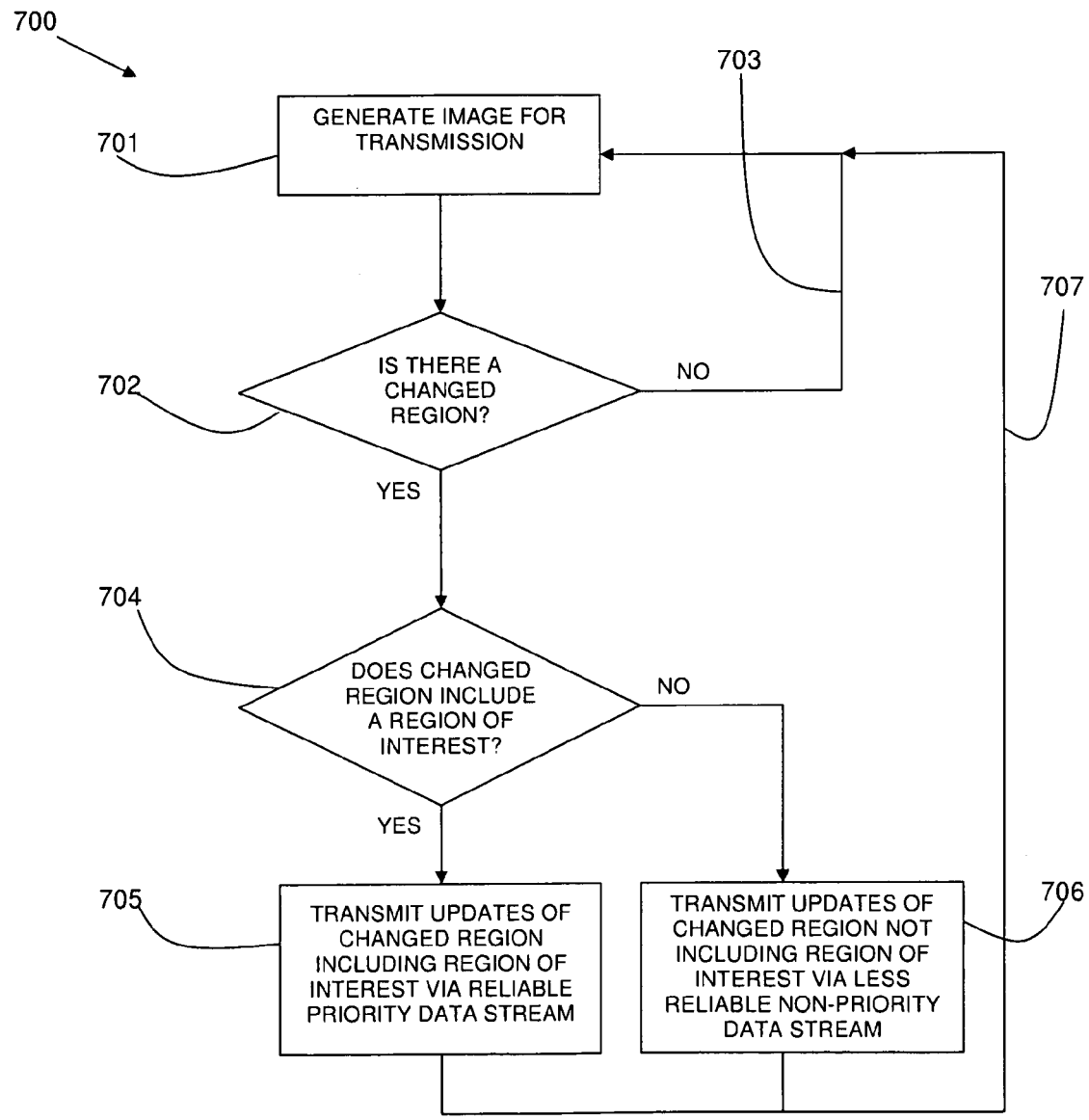
FIG. 7 is a flow diagram of a process at a server for determining the regions of interest and/or regions of non-interest of an image that are to be sent for transmission and for transmitting such regions in accordance with an exemplary embodiment.

Referring to FIG. 7, a flow diagram of a process 700 at a server is provided according to an exemplary embodiment. The process 700 may be used for determining the regions of interest and/or regions of non-interest of an image that are to be sent for transmission and for transmitting such regions. In step 701, the image to be transmitted may be generated as a result of monitoring (e.g., periodically) the overall image. In step 702, it may be determined whether there are any changed regions in the image. If in step 702 it is determined that there are no changed regions, then the process 700 may loop back via branch 703 to step 701 so that monitoring may continue.

If in step 702 it is determined that there are changed regions, then in step 704 it may be determined for each changed region whether such changed region includes a region of interest. If such changed region includes a region of interest, then in step 705 updates of such changed region may be transmitted to the client via a reliable (priority) data stream. Conversely, if such changed region does not include a region of interest, then in step 706 updates of such changed region may be transmitted to the client via a less reliable (non-priority) data stream. Then, via branch 707 the process 700 may loop back to step 701 so that monitoring may continue.

Figure 8:
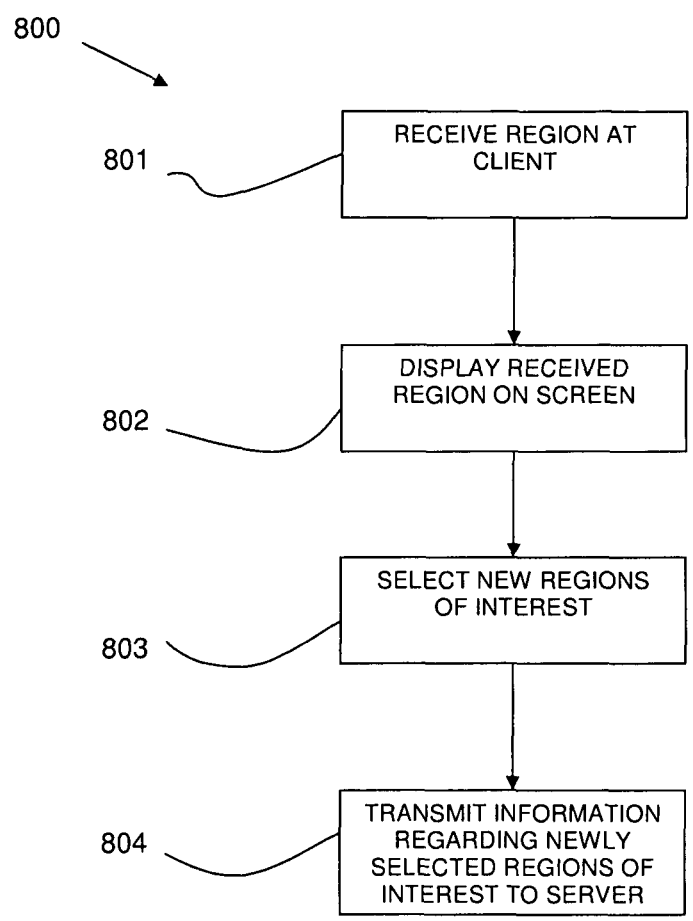
FIG. 8 is a flow diagram of a process at a client for selecting regions of interest of an image and for transmitting information regarding such regions of interest to a server in accordance with an exemplary embodiment.

Referring to FIG. 8, a flow diagram of a process 800 at a client for selecting regions of interest of an image and for transmitting information regarding such regions of interest to a server in accordance with an exemplary embodiment is provided. The process 800 may be used in conjunction with an embodiment of a remote visualization system implementing a client feedback mechanism (see the exemplary embodiment described herein with reference to FIG. 4). In step 801 the client may receive a region of the image. In step 802, the client may display the received region on screen. In step 803, the client may examine the received region and may select any regions of interest from the received region. In step 804, the client may transmit the information regarding the newly selected regions of interest to the server.

The methods described herein may be provided as a technical service to a client over a network. For example, the methods may be provided as a middleware implementation, a database optimization, application maintenance, or facilities hosting.

The various embodiments described herein may reduce bandwidth usage and may enhance usability on high latency networks such as satellite networks. Moreover, the various embodiments may allow for control of bandwidth over each connection on which they are implemented in expensive networks such as satellite networks. For example, thresholds may be set for the low priority data stream.

The various embodiments may assume the form of an entirely hardware embodiment, an entirely software embodiment, or an embodiment containing both hardware and software elements.

The various embodiments may be implemented in software, which includes but is not limited to firmware, resident software, microcode, etc.

Furthermore, the various embodiments may assume the form of a computer program product accessible from a computer-usable or computer-readable medium providing program code for use by or in connection with a computer or any instruction execution system. For the purposes of this description, a computer-usable or computer-readable medium may be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk, and an optical disk. Current examples of optical disks include compact disc read only memory (CD-ROM), compact disc read/write (CD-R/W), and DVD.

Improvements and modifications may be made to the various embodiments described herein without departing from the scope of the disclosure.

The invention claimed is:

1. A method for transmitting an image for remote display, the method comprising:
   determining a region of interest and a region of non-interest of the image;
   sending data relating to the region of interest via a reliable priority data stream, wherein the priority data stream is sent using a first transmission protocol;
   sending data relating to the region of non-interest via a less reliable non-priority data stream, wherein the non-priority data stream is sent using a second transmission protocol distinct from the first transmission protocol; and
   displaying the region of interest and the region of non-interest.

2. The method according to claim 1, wherein the priority data stream has a higher quality of image transmission than the non-priority data stream.

3. The method according to claim 1, wherein the priority data stream has a higher update frequency than the non-priority data stream.

4. The method according to claim 1, wherein determining the region of interest comprises detecting the region of interest via at least one of the following:
   change in the image from a previous frame;
   rate of change in the image or portions thereof;
   one or more user-defined parameters;
   seed points; and
   an application programming interface of one of a plurality of applications that generate the image.

5. The method according to claim 1, wherein determining the region of interest comprises selecting the region of interest dynamically via a user.

6. The method according to claim 5, wherein selecting the region of interest dynamically via a user is carried out at a server transmitting the image.

7. The method according to claim 5, wherein selecting the region of interest dynamically via a user is carried out at a client and comprises sending feedback on the region of interest to a server.

8. The method according to claim 5, wherein selecting the region of interest dynamically via a user comprises using an input device.

9. The method according to claim 8, wherein selecting the region of interest dynamically via a user further comprises expanding the region of interest radially from a point on the image selected by a user while the user rests the input device on the point.

10. The method according to claim 1, wherein the priority data stream is an uncompressed raw image stream or a compressed image stream using lossless or almost lossless protocols, and wherein the non-priority data stream is a highly compressed image stream.

11. A system for transmitting an image for remote display, the system comprising:
   a server configured for generating the image, the server comprising one or more processing units;
   a selector configured for determining a region of interest and a region of non-interest of the image;
   a client configured for displaying the region of interest and the region of non-interest;
   a reliable priority transmission apparatus operatively coupling the server to the client, wherein the priority transmission apparatus is configured for sending data relating to the region of interest using a first transmission protocol; and
   a less reliable non-priority transmission apparatus operatively coupling the server to the client, wherein the non-priority transmission apparatus is configured for sending data relating to the region of non-interest using a second transmission protocol distinct from the first transmission protocol.

12. The system according to claim 11, wherein the priority transmission apparatus has a higher quality of image transmission than the non-priority transmission apparatus.

13. The system according to claim 11, wherein the priority transmission apparatus has a higher update frequency than the non-priority transmission apparatus.

14. The system according to claim 11, wherein the selector is configured for detecting the region of interest via at least one of the following:
   change in the image from a previous frame;
   rate of change in the image or portions thereof;
   one or more user-defined parameters;
   seed points; and
   an application programming interface of one of a plurality of applications that generate the image.

15. The system according to claim 11, wherein the selector is configured for selecting the region of interest dynamically via a user.

16. The system according to claim 15, wherein the server is further configured for selecting the region of interest dynamically via a user.

17. The system according to claim 15, wherein the client is further configured for selecting the region of interest dynamically via a user, and wherein the system further comprises a feedback transmission apparatus that operatively couples the client to the server and is configured for sending feedback on the region of interest from the client to the server.

18. The system according to claim 15, further comprising an input device configured for selecting the region of interest dynamically via a user.

19. The system according to claim 18, wherein the system is configured for expanding the region of interest radially from a point on the image selected by a user while the user rests the input device on the point.

20. The system according to claim 11, wherein the priority transmission apparatus is configured for sending an uncompressed raw image stream or a compressed image stream using lossless or almost lossless protocols, and wherein the non-priority transmission apparatus is configured for sending a highly compressed image stream.

21. A computer program product stored on a non-signal computer-readable medium, which, when executed by one or more processing units, performs an operation for transmitting an image for remote display, the operation comprising:
   determining a region of interest and a region of non-interest of the image;
   sending data relating to the region of interest via a reliable priority data stream, wherein the priority data stream is sent using a first transmission protocol;

sending data relating to the region of non-interest via a less reliable non-priority data stream, wherein the non-priority data stream is sent using a second transmission protocol distinct from the first transmission protocol; and displaying the region of interest and the region of non-interest.

* * * * *